United States Patent [19]

Kawakita et al.

[11] Patent Number: 5,254,055
[45] Date of Patent: Oct. 19, 1993

[54] SEAT RECLINING DEVICE WITH PLANETARY GEARS

[75] Inventors: Tadashi Kawakita; Chiyokatsu Yokokura; Mikio Kihata, all of Kanagawa, Japan

[73] Assignee: Ikeda Bussan Co., Ltd., Ayase, Japan

[21] Appl. No.: 904,665

[22] Filed: Jun. 26, 1992

[30] Foreign Application Priority Data

Jun. 28, 1991 [JP] Japan .................. 3-057875[U]

[51] Int. Cl.$^5$ ................................ A47C 1/02
[52] U.S. Cl. ...................... 475/341; 297/362
[58] Field of Search ............ 297/353, 354, 362; 475/317, 338, 341

[56] References Cited

U.S. PATENT DOCUMENTS

| | | | |
|---|---|---|---|
| 3,972,563 | 8/1976 | Gustafsson | 297/362 |
| 4,020,717 | 5/1977 | Johnson | 297/362 |
| 4,085,969 | 4/1978 | Nakane et al. | 297/367 |
| 4,504,091 | 3/1985 | Oshiro | 297/362 |
| 4,708,392 | 11/1987 | Werner et al. | 297/362 |
| 4,880,274 | 11/1989 | Ichikawa | 297/362 |
| 5,090,771 | 2/1992 | Kawakita | 297/362 |
| 5,127,286 | 7/1992 | Wittig | 297/362 X |

FOREIGN PATENT DOCUMENTS

| | | |
|---|---|---|
| 63-85138 | 6/1988 | Japan . |
| 63-95853 | 6/1988 | Japan . |
| 18093 | 10/1898 | Switzerland ............. 475/341 |
| 2214423A | 9/1989 | United Kingdom . |
| 2218627A | 11/1989 | United Kingdom . |

Primary Examiner—Leslie A. Braun
Assistant Examiner—Khoi Q. Ta
Attorney, Agent, or Firm—Foley & Lardner

[57] ABSTRACT

A seat reclining device comprises a base plate secured to a seat base of a seat, an arm plate secured to a seatback of the seat, and a planetary gear mechanism interposed between the base and arm plates in such a manner that operation of the mechanism induces a stepless pivoting movement of the arm plate relative to the base plate. The mechanism uses respective given portions of the base and arm plates as essential parts thereof, so that separation of the given portions from each other tends to cause malfunction of the mechanism. A retainer is employed which holds the base plate and the arm plate in such a manner as to suppress the separation of the base and arm plates.

10 Claims, 3 Drawing Sheets

SEAT RECLINING DEVICE WITH PLANETARY GEARS

BACKGROUND OF THE INVENTION

1. Field of the Invention

The present invention relates to seat reclining devices, and more particularly to seat reclining devices of a type which uses a planetary gear mechanism as an essential part of the device.

2. Description of the Prior art

Hitherto, for providing seat occupants with a comfortable sitting posture, various seat reclining devices have been proposed and put into practical use particularly in the field of passenger motor vehicles.

Some of them are of a type which uses a planetary gear mechanism as an essential part of the device, which are shown in for example Japanese Utility Model First Provisional Publications Nos. 63-85138 and 63-95853. Due to the nature of the planetary gear mechanism, a smoothed stepless pivoting of the seatback relative to the seat base is obtained.

However, even in the seat reclining devices of such type, prolonged usage tends to produce undesirable play of parts of the reclining device due to inevitable abrasion of them, which play makes the stepless pivoting of the seatback stiff and poor. Furthermore, when, due to a vehicle collision or the like, an abnormally big force is applied to the device, cancellation of locked condition of the gear parts tends to occur, which causes undesired sudden pivoting of the seatback relative to the seat base.

SUMMARY OF THE INVENTION

It is therefore an object of the present invention to provide a seat reclining device which is free of the above-mentioned drawbacks.

According to the present invention, there is provided a seat reclining device for a reclining seat, which device comprises a base plate adapted to be secured to a seat base of the seat; an arm plate adapted to be secured to a seatback of the seat; a planetary gear mechanism interposed between the base and arm plates in such a manner that operation of the mechanism induces a stepless pivoting movement of the arm plate relative to the base plate, the mechanism using respective given portions of the base and arm plates as essential parts thereof, so that separation of the given portions from each other tends to cause malfunction of the mechanism; and a retainer which holds the base plate and the arm plate in such a manner as to suppress the separation of the base and arm plates.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
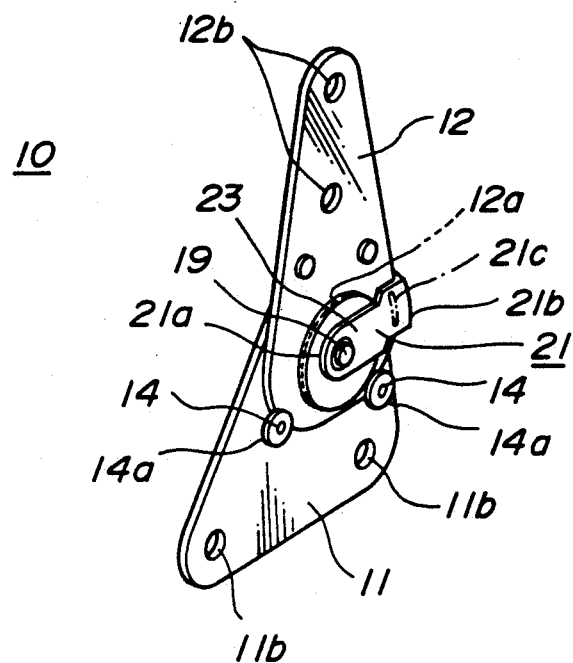
FIG. 1 is a perspective view of a first embodiment of the present invention, which is a seat reclining device.
Figure 2:
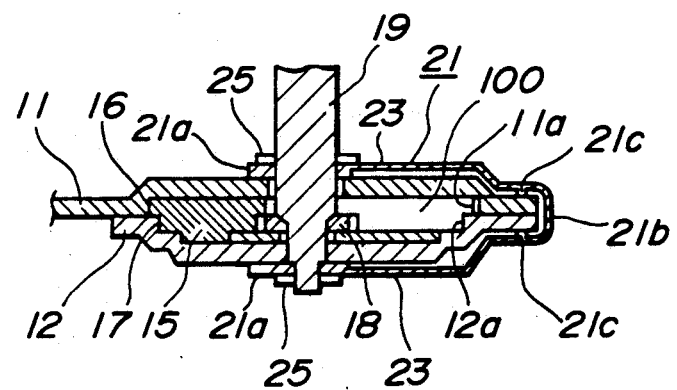
FIG. 2 is an enlarged sectional view of the seat reclining device of the first embodiment.

Referring to FIGS. 1 and 2 there is shown a seat reclining device 10 which is a first embodiment of the present invention.

As is seen from FIG. 1, the seat reclining device 10 comprises a base plate 11 which is secured to a seat base (not shown) and an arm plate 12 which is secured to a seatback (not shown). The base plate 11 has two bolt openings 11b through which bolts (not shown) passes for connection with the seat base, and also the arm plate 12 has two bolt openings 12b through which bolts (not shown) passe for connection with the seatback. These two plates 11 and 12 are pivotally connected to each other through a planetary gear mechanism which will become apparent from the following description.

As is seen from FIG. 2, the base plate 11 has a circular recess (no numeral) whose cylindrical side wall is formed with a plurality of internal teeth 11a which constitute a larger ring gear 11a. Also the arm plate 12 has, at a portion facing the circular recess of the base plate 11, a circular recess (no numeral) whose cylindrical side wall is formed with a plurality of internal teeth 12a which constitute a smaller ring gear 12a. The smaller ring gear 12a of the arm plate 12 is smaller in diameter than the larger ring gear 11a of the base plate 11. As shown, upon assembly of the base plate 11 and the arm plate 12, the two circular recesses of them concentrically face each other to constitute an enclosed circular space 100.

Within the circular space 100, there are installed four planetary gear bodies 15 which are arranged at evenly spaced intervals. Each gear body 15 has coaxially arranged first and second gears 16 and 17 which are respectively meshed with the larger and smaller ring gears 11a and 12a of the base and arm plates 11 and 12. The second external gear 17 of each gear body 15 is meshed with a sun gear 18 which is securely disposed on a rotation shaft 19. As shown, the rotation shaft 19 passes through center openings of the circular recesses of the base and arm plates 11 and 12.

Although not shown in the drawings, the rotation shaft 19 is driven in both directions by an electric motor. Thus, when, upon energization of the motor, the rotation shaft 19 is rotated about its axis in one direction, the arm plate 12 (or seatback) is forced to pivot about the axis of the rotation shaft 19 in one direction at a speed determined by the sizes (more specifically, the numbers of teeth) of the sun gear 18, the first and second gears 16 and 17 and the larger and smaller ring gears 11a and 12a. This pivoting movement of the arm plate 12 (or seatback) is carried out in a stepless manner. When the motor is deenergized, the rotation shaft 19 stops and thus the arm plate 12 (or seatback) stops at an angular position. Due to the nature of the planetary gear mechanism, the arm plate 12 (or seatback) is locked at this new angular position.

As is seen from FIG. 1, the arm plate 12 has a semicircular lower part. Slidably engaged with this lower part are enlarged head portions 14a of two bolts 14 which are secured to the base plate 11. Due to provision of these bolts 14, the arm plate 12 is stably held in position even when an abnormal external force is applied thereto.

As is seen from FIGS. 1 and 2, a generally U-shaped retainer 21 of metal is employed for assuring the connection between the base plate 11 and the arm plate 12.

The retainer 21 comprises a reduced U-shaped base portion 21b which covers or straddles end portions of the base and arm plates 11 and 12 and two arm portions 23 which extend in the same direction from the base portion 21b to hold therebetween the base and arm plates 11 and 12. The reduced base portion 21b is formed at its leg portions with inward projections 21c which abut against respective outer peripheries of the base and arm plates 11 and 12. The arm portions 23 have at their thicker leading ends 21a respective openings (no numerals) through which the rotation shaft 19 passes. Washers 25 are fixed to the rotation shaft 19 for stably holding the retainer 21 on the rotation shaft 19.

It is now to be noted that, due to provision of such retainer 21, the operative connection between the base plate 11 and the arm plate 12 is assured. That is, even when an abnormally big force is applied these plates 11 and 12 in a direction to separate them from each other, such undesired separation is suppressed by the retainer 21.

The base portion 21b of the retainer 21 can act as a stopper for the arm plate 12. That is, when the arm plate 12 is pivoted rearward, a rear edge of the arm plate 12 is brought into abutment with an upper edge of the retainer 21.

Figure 3:
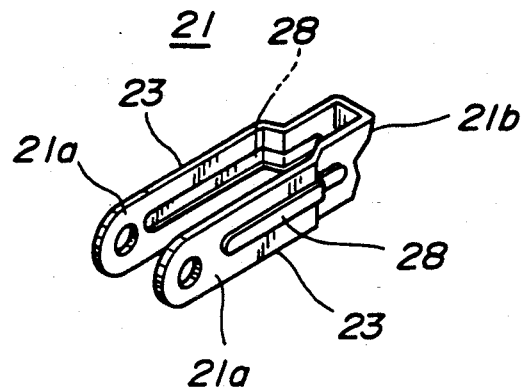
FIG. 3 is a perspective view of a modified retainer usable in the first embodiment.

Referring to FIG. 3, there is shown a modification of the retainer 21. This modified retainer 21 has an elongated base portion 21b for permitting the arm plate 12 (see FIG. 1) to take a further rearward angular position. As shown, for increasing mechanical strength, each arm portion 23 is formed with a longitudinally extending bead 28.

Figure 4:
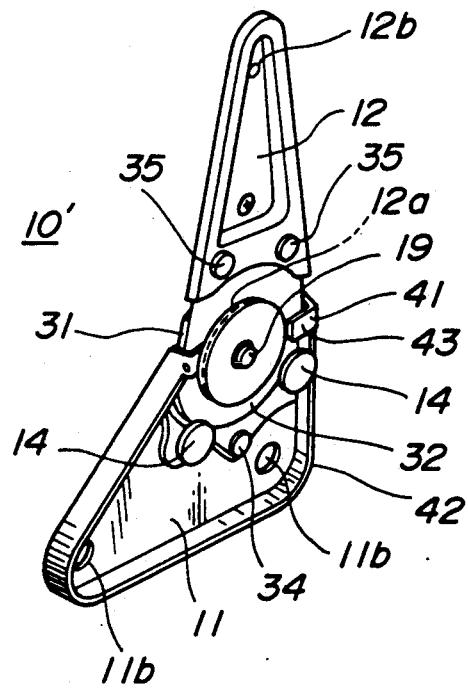
FIG. 4 is a view similar to FIG. 1, but showing a second embodiment of the present invention.

Referring to FIG. 4, there is shown a seat reclining device 10' which is a second embodiment of the present invention. For ease of description, substantially same parts and constructions as those of the first embodiment are omitted from the following description and such same parts and constructions are denoted by the same numerals.

In this second embodiment, the larger and smaller ring gears 11a and 12a for the base and arm plates 11 and 12 are provided by separate gear plates 31 and 32. These gear plates 31 and 32 are respectively connected to the base and arm plates 11 and 12 through rivets 34 and 35.

A retainer 41 used in this second embodiment is provided by the base plate 11. That is, the base plate 11 is integrally formed along its periphery with a surrounding wall 42. A lug 43 extends inwardly from a part of the surrounding wall 42 in a manner to hold the arm plate 12. The lug 43 has an inner surface slidably engaged with the arm plate 12. Thus, the part of the surrounding wall 42 and the lug 43 constitute the retainer 41. If desired, the lug 43 may extend to the rotation shaft 19 for connection therewith.

Figure 5:
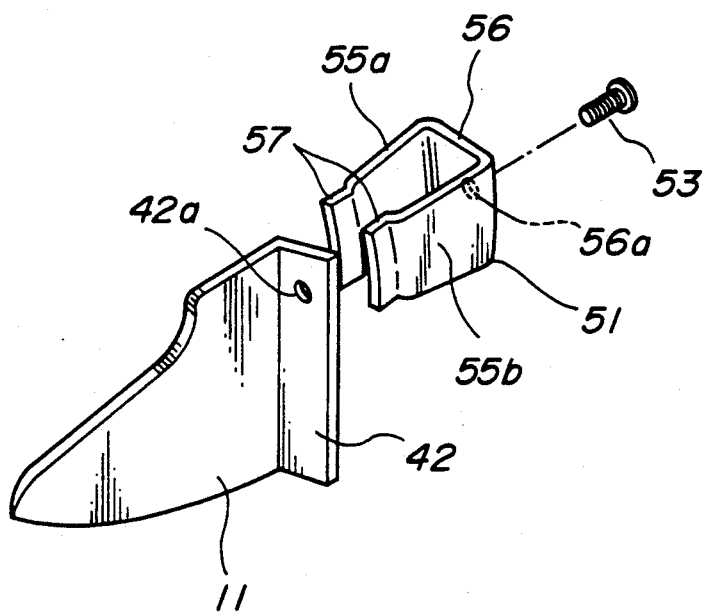
FIG. 5 is a perspective view a modified retainer usable in the second embodiment.

Referring to FIG. 5, there is shown a modification 51 of the retainer 41. This modified retainer 51 is a separate member which is connected by a bolt 53 to a part of the surrounding wall 42 of the base plate 11. For this connection, the surrounding wall 42 is formed with a threaded bolt opening 42a.

The modified retainer 41 is of a generally U-shaped structure, comprising a base portion 56 which has a bolt opening 56a and two side wall portions 55a and 55b which extend perpendicular from lateral ends of the base portion 56. Each side wall portion 55a or 55b has an inwardly projected leading end 57. Upon assembly, the inwardly projected leading ends 57 of the the two side wall portions 55a and 55b abut against respective outer surfaces of the base and arm plates 11 and 12. If desired, the side wall portion 55a may be removed.

Due to the same reasons as that described in the first embodiment, provision of such retainer 41 or 51 assures the operative connection between the base plate 11 and the arm plate 12. Furthermore, the retainer 41 or 51 can act as a stopper for the arm plate 12 like in the case of the first embodiment.

What is claimed is:

1. A seat reclining device for a reclining seat, comprising:

a base plate adapted to be secured to a seat base of the seat, said base plate including a first ring gear;

an arm plate adapted to be secured to a seatback of the seat, said arm plate including a second ring gear;

a planetary gear mechanism interposed between said base and arm plates which induces a stepless pivoting movement of said arm plate relative to said base plate, said planetary gear mechanism including said first and second ring gears whereby separation of said first and second ring gears from each other tends to cause a malfunction of said planetary gear mechanism, a plurality of planetary gear bodies, each gear body having first and second gears respectively meshed with said first and second ring gears, a sun gear meshed with the second gear of each gear body, and a portion shaft on which said sun gear is securely disposed, said rotation shaft passing through respective center openings formed in said base and arm plates, a retainer which holds said base plate and said arm plate to suppress the separation of said base and arm plates, said retainer being a generally U-shaped metal member and including a reduced U-shaped base portion which straddles end portions of said base and arm plates, and two arm portions which extend in the same direction from said base portion to hold therebetween said base and arm plates, said arm portions having at their leading ends respective openings through which said rotation shaft passes;

wherein said first ring gear, said second ring gear and said sun gear are concentrically arranged with respect to an axis of said rotation shaft.

2. A seat reclining device as claimed in claim 1, further comprising two washers which are fixed to the rotation shaft for stably holding said retainer on said rotation shaft.

3. A seat reclining device as claimed in claim 2, in which said base portion is formed at its leg portions with inward projections which abut against respective outer peripheries of said base and arm plates.

4. A seat reclining device as claimed in claim 3, in which the leading end of each arm portion of said retainer is enlarged in thickness.

5. A seat reclining device as claimed in claim 2, in which each of said arm portions of said retainer is formed with a longitudinally extending bead.

6. A seat reclining device for a reclining seat, comprising:

a metal base plate adapted to be secured to a seat base of the seat, said base plate including a first ring gear;

a metal arm plate adapted to be secured to a seatback of the seat, said arm plate including a second ring gear and being a separate member from said base plate;

a planetary gear mechanism interposed between said base and arm plates which induces a stepless pivoting movement of said arm plate relative to said base plate, said planetary gear mechanism including said first and second ring gears whereby separation of said first and second ring gears from each other tends to cause a malfunction of said planetary gear mechanism, a plurality of planetary gear bodies, each gear body having first and second gears respectively meshed with said first and second ring gears, a sun gear meshed with the second gear of each gear body, and a rotation shaft on which said sun gear is securely disposed, said rotation shaft passing through respective center openings formed in said base and arm plates, a retainer which holds said base plate and said arm plate to suppress the separation of said base and arm plates, said retainer being a lug member which is integral with said base plate, said lug member straddling an end of said arm plate and having an inner surface slidably engaged with an outer surface of said arm plate;

means for fixing said base plate to said seat base and said arm plate to said seatback;

wherein said first ring gear, said second ring gear and said sun gear are concentrically arranged with respect to an axis of said rotation shaft.

7. A seat reclining device for a reclining seat, comprising:

a metal base plate adapted to be secured to a seat base of the seat, said base plate including a first ring gear and a surrounding wall at its periphery;

a metal arm plate adapted to be secured to a seatback of the seat, said arm plate including a second ring gear and being a separate member from said base plate;

a planetary gear mechanism interposed between said base and arm plates which induces a stepless pivoting movement of said arm plate relative to said base plate, said planetary gear mechanism including said first and second ring gears, whereby separation of said first and second gears from each other tends to cause a malfunction of said planetary gear mechanism, a plurality of planetary gear bodies, each gear body having first and second gears respectively meshed with said first and second ring gears, a sun gear meshed with the second gear of each gear body, and a rotation shaft on which said sun gear is securely disposed, said rotation shaft passing through respective center openings formed in said base and arm plates, a retainer which holds said base plate and said arm plate to suppress the separation of said base and arm plates, said retainer being a separate metal member having a base portion fixed to said surrounding wall and two side wall portions having inwardly projected leading ends which each abut against respective outer surfaces of said base and arm plates;

means for fixing said base plate to said seat base and said arm plate to said seatback;

wherein said first ring gear, said second ring gear and said sun gear are concentrically arranged with respect to an axis of said rotation shaft.

8. A seat reclining device for a reclining seat, comprising:

a base plate adapted to be secured to a seat base of the seat, said base plate having a first ring gear;

an arm plate adapted to be secured to a seatback of the seat, said arm plate having a second ring gear which is adjacent to said first ring gear, a planetary gear mechanism which is interposed between said base and arm plates and which induces a stepless pivoting movement of said arm plate relative to said base plate, said planetary gear mechanism including said first and second ring gears whereby separation of said first and second ring gears from each other tends to induce a malfunction of said planetary gear mechanism, said planetary gear mechanism further including a rotation shaft which passes through respective center openings formed in said base plate and said arm plate; and a retainer which holds said base plate and said arm plate to suppress the separation of said first and second ring gears, said retainer being a generally U-shaped metal member which includes a reduced U-shaped base portion which straddles outer surfaces of said base and arm plates, and two arm portions which extend in the same direction from said U-shaped base portion to hold therebetween the adjacent first and second ring gears, said arm portions each having at their leading ends respective openings through which said rotation shaft passes.

9. A seat reclining device for a reclining seat, comprising:

a base plate adapted to be secured to a seat base of the seat, said base plate having a first ring gear;

an arm plate adapted to be secured to a seatback of the seat, said arm plate having a second ring gear which is overlapped with said first ring gear;

a planetary gear mechanism interposed between said base and arm plates to induce a stepless pivoting movement of said arm plate relative to said base plate, said planetary gear mechanism including said first and second ring gears whereby separation of said first and second ring gears from each other tends to induce a malfunction of said mechanism, said planetary gear mechanism further including a rotation shaft which passes through respective center openings formed in said base plate and said arm plate; and a retainer which holds said base plate and said arm plate to suppress the separation of said first and second ring gears, said retainer being a lug member which is connected to a peripheral edge of said base plate, said lug member straddling at least an outer surface of said arm plate and having an inner surface slidably engaged with said outer surface of said arm plate.

10. A seat reclining device as claimed in claim 9, wherein said lug member is integral with said base plate.

* * * * *